United States Patent [19]

Rooker et al.

[11] Patent Number: 4,905,722
[45] Date of Patent: Mar. 6, 1990

[54] COMPOSITE RUPTURE DISK ASSEMBLY

[75] Inventors: Mitchel Rooker, Sand Springs; Stephen Farwell, Owasso, both of Okla.

[73] Assignee: BS&B Safety Systems, Inc., Tulsa, Okla.

[21] Appl. No.: 338,869

[22] Filed: Apr. 17, 1989

Related U.S. Application Data

[63] Continuation-in-part of Ser. No. 210,851, Jun. 24, 1988, abandoned.

[51] Int. Cl.⁴ .............................................. F16K 17/16
[52] U.S. Cl. ................................. 137/68.1; 220/89 A
[58] Field of Search ....................... 137/68.1; 220/89 A

[56] References Cited

U.S. PATENT DOCUMENTS

| | | | |
|---|---|---|---|
| 2,523,068 | 9/1950 | Simpson et al. | 220/89 |
| 2,954,897 | 10/1960 | Hansen et al. | 220/89 |
| 3,091,359 | 5/1963 | Wood | 220/89 |
| 3,109,554 | 11/1963 | Porter | 220/89 |
| 3,123,250 | 3/1964 | Lemmer | 220/89 |
| 3,445,032 | 5/1969 | Raidl, Jr. et al. | 220/89 |
| 3,693,691 | 9/1972 | Summers | 152/427 |
| 3,698,598 | 10/1972 | Wood et al. | 220/89 A |
| 3,704,807 | 12/1972 | Lidgard | 220/89 A |
| 3,709,239 | 1/1973 | Morck, Jr. | 137/68.1 |
| 3,722,734 | 3/1973 | Raidl, Jr. | 137/68.1 X |
| 4,278,181 | 7/1981 | Wood et al. | 220/89 A |

FOREIGN PATENT DOCUMENTS 748953  5/1956  United Kingdom .
774812  5/1957  United Kingdom .

Primary Examiner—John Rivell
Attorney, Agent, or Firm—Laney, Dougherty, Hessin & Beavers

[57] ABSTRACT

An improved composite rupture disk assembly adapted to be supported between inlet and outlet supporting members is provided. The assembly is comprised of a resilient sealing member and a rupture member having a plurality of elongated openings formed therein which extend outwardly from a central portion thereof. At least one rupture pressure determining score is formed in the rupture member connecting the inner ends of two or more of the elongated openings so that rupture of the composite assembly occurs when pressure is exerted on the sealing member and transmitted to the rupture member at a level equal to or exceeding the rupture pressure of the rupture member.

20 Claims, 2 Drawing Sheets

COMPOSITE RUPTURE DISK ASSEMBLY

CROSS-REFERENCE TO RELATED APPLICATION

This is a continuation-in-part application of prior application Ser. No. 07/210,851 filed June 24, 1988.

BACKGROUND OF THE INVENTION

1. Field of the Invention

The present invention relates to a composite rupture disk assembly, and more particularly, to an improved composite rupture disk assembly of the type which includes a resilient sealing member and a rupture member.

2. Description of the Prior Art

A variety of safety pressure relief devices of the rupturable type have been developed and used heretofore. Commonly, such devices include a rupture member or disk which is of a particular strength whereby it ruptures when a predetermined fluid pressure is exerted thereon. The rupture disk is most often clamped between a pair of annular supporting members positioned in a pressure relief passageway or conduit connected to a pressure vessel or system being protected by the rupture disk.

While safety pressure relief devices comprised of a single rupture disk supported between supporting members are commonly utilized in particular applications, composite rupture disk assemblies comprised of two or more parts are also commonly used. A particular type of composite rupture disk assembly to which this invention relates is comprised of a metallic or other rigid material rupture member positioned adjacent a resilient sealing member. Such composite rupture disk assemblies are adapted to be clamped between annular supporting members, and often include several other parts in addition to the rupture member and resilient sealing member.

The rupture member includes openings formed therein whereby when fluid pressure is exerted on the sealing member, the sealing member is pressed against the rupture member and the fluid pressure is transmitted to the rupture member. When the pressure reaches a predetermined rupture pressure, i.e., the pressure at which the rupture member is designed to fail, rupture occurs whereby the rupture member as well as the sealing member tear open and fluid pressure is relieved through the annular supporting members.

In applications where reverse pressures can be encountered, e.g., a vacuum can be generated within the vessel or system being protected, a support member is provided which is positioned on the side of the resilient sealing member opposite the rupture member. When reverse pressure is applied to the composite assembly, the sealing member is pressed against the support member which either prevents the sealing member from rupturing, or the support member ruptures when the reverse pressure reaches a predetermined rupture pressure thereby relieving fluid pressure in the reverse direction.

Heretofore, the rupture member of the above-described type of composite rupture disk assembly has included a plurality of elongated openings formed therein, generally in the form of slits, which extend outwardly from a central portion towards the periphery of the rupture member. The slits have included enlarged circular holes at the inner and outer ends thereof, and the slits and holes have defined sector shapes in the rupture member. In order to control and predetermine the rupture pressure of the rupture member, the distance between the closest of the holes at the inner ends of adjacent slits and the thickness of the material from which the rupture member is formed have been varied. That is, a trial and error procedure has been employed whereby one or more rupture members of an initial material thickness with a particular hole distance are manufactured and tested. Depending upon the resultant rupture pressure of the initial rupture members, additional rupture members are produced and tested with changes in the hole distance and/or in the material thickness until the desired rupture pressure is obtained. A group of rupture members is then produced identical in material thickness and hole distance to the rupture member having the desired rupture pressure.

As is well understood by those skilled in the art, the trial and error procedure described above is tedious, timeconsuming and expensive. By the present invention an improved rupture member and composite rupture disk assembly including the rupture member are provided wherein the holes at the ends of the slits can optionally be eliminated and, more importantly, instead of controlling the rupture pressure by means of the distance between adjacent holes or the thickness of the material forming the rupture member, one or more scores are formed in the rupture member between at least two of the elongated openings formed therein. Such score or scores are easily formed in a rupture member, and allow a single thickness of material to be used for rupture members having a variety of predetermined rupture pressures as well as a more economical trial and error procedure to be followed and a more economical composite rupture disk assembly to be produced.

SUMMARY OF THE INVENTION

An improved composite rupture disk assembly adapted to be supported between inlet and outlet annular supporting members is provided. The assembly is comprised of a resilient sealing member and an adjacently positioned rupture member having a plurality of elongated openings formed therein. At least one rupture pressure determining score is formed in the rupture member connecting the ends of two or more of the elongated openings so that rupture of the assembly occurs when pressure is exerted on the sealing member and transmitted to the rupture member at a level equal to or exceeding the rupture pressure of the rupture member.

In preferred embodiments, the elongated openings extend outwardly from a central portion defining a plurality of sector shapes in the rupture member, or the elongated openings lie on a line defining a substantially circular shape in the rupture member.

It is, therefore, an object of the present invention to provide an improved composite rupture disk assembly.

A further object of the present invention is the provision of an improved rupture member for use in a composite rupture disk assembly having one or more rupture pressure determining scores formed therein thereby making the rupture member manufacturing procedure less complicated and less expensive to carry out.

Another object of the present invention is the provision of an improved composite rupture disk assembly which is less expensive to produce.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
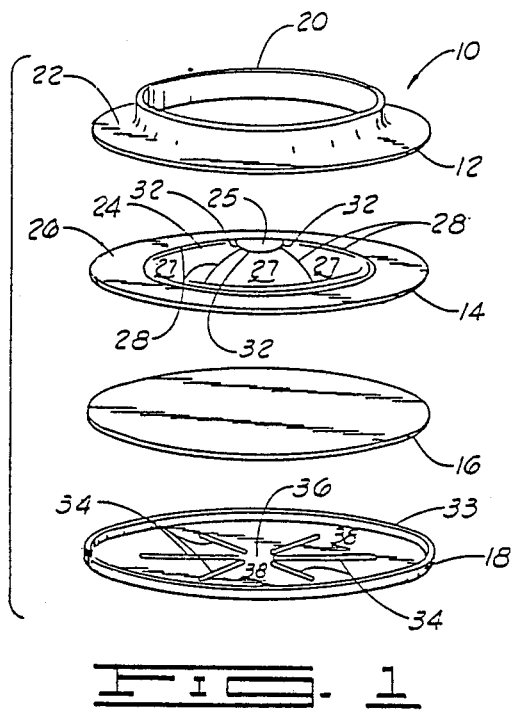
FIG. 1 is an exploded perspective view showing the various parts of one form of a composite rupture disk assembly of the present invention.
Figure 2:
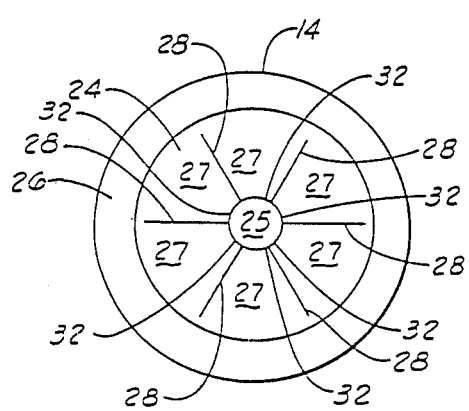
FIG. 2 is a top plan view of the rupture member of the assembly illustrated in FIG. 1.

Referring now to the drawings and particularly to FIGS. 1 and 2, one form of composite rupture disk assembly of the present invention is illustrated and generally designated by the numeral 10. The assembly 10 includes an annular positioning member 12, a rupture member 14 positioned adjacent the positioning member 12, a resilient sealing member 16 positioned adjacent the rupture member 14, and a support member 18 positioned adjacent the sealing member 16.

Figure 6:
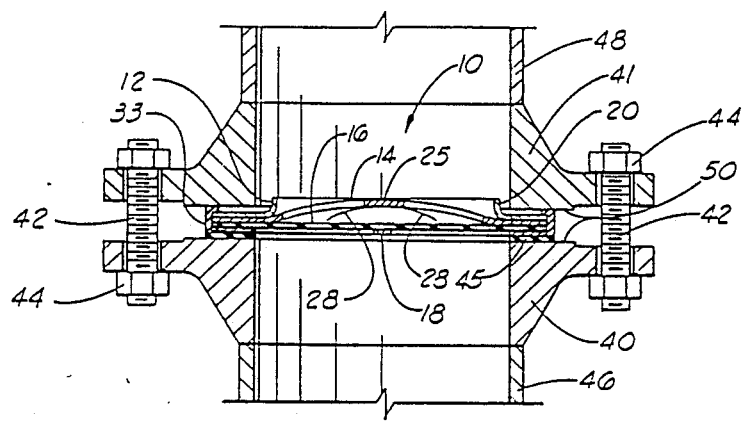
FIG. 6 is a vertical cross-sectional view of the composite rupture disk assembly illustrated in FIG. 1 mounted between a pair of annular support members.
Figure 7:
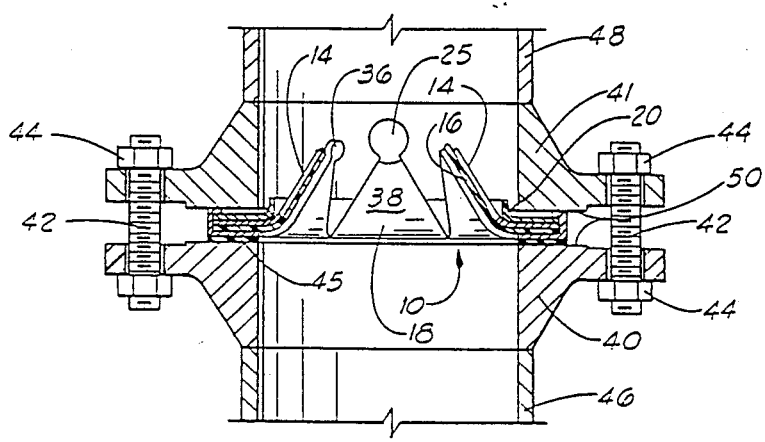
FIG. 7 is a vertical cross-sectional view similar to FIG. 6 but showing the composite rupture disk assembly after rupture has taken place.

The positioning member 12 is formed of rigid material and includes a central upstanding frusto-conical portion 20 and an annular flat flange portion 22. The use of the positioning member 12 with the assembly 10 is optional, but when included it functions to position the assembly in annular supporting members between which it is clamped (as shown in FIGS. 6 and 7) as well as to protect the concave-convex portion of the rupture member 14 from damage during handling.

The rupture member 14 is a substantially circular section of thin rigid material having a concave-convex portion 24 connected to an annular flat flange portion 26. A plurality of elongated openings are formed in the concave-convex portion 24 of the rupture member 14 which extend outwardly from a central portion 25 thereof. In the form illustrated in FIGS. 1 and 2, the elongated openings are slits 28 which are equally spaced around the concave-convex portion 24 and which radiate outwardly from the central portion 25. The slits 28 terminate near the annular flat flange portion 26 of the rupture member 14 thereby defining a plurality of sector shaped portions 27 therein.

Figure 3:
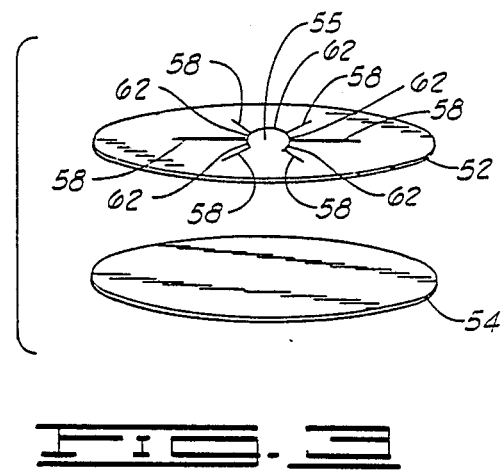
FIG. 3 is a view similar to FIG. 1 showing an alternate form of composite rupture disk assembly of the present invention.
Figure 4:
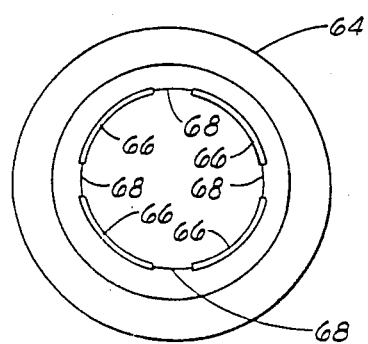
FIG. 4 is a top plan view of another alternate form of rupture member of the present invention which can be utilized in the assemblies of FIGS. 1 or 3.

As illustrated in FIG. 3, the rupture member of the present invention, designated by the numeral 52 in FIG. 3, can be flat. The rupture member 52 includes elongated openings 58, preferably slits, extending outwardly from a central portion 55. As will be understood by those skilled in the art, other forms of elongated openings can be utilized in both rupture members including concave-convex portions (FIGS. 1 and 2) and rupture members which are flat (FIG. 3). For example, as shown in FIG. 4 wherein the rupture member is designated by the numeral 64, the elongated openings 66 can be slots. Also as shown in FIG. 4, the elongated openings 66 can be arcuate and lie on a line defining a substantially circular shape in the rupture member 64. The term "substantially circular shape" is used herein to mean a circle, elipse or a series of straight lines defining a poly-sided shape. Generally, the elongated openings utilized in the rupture member of the present invention can be straight, curved or of other configuration, and can be in the form of slits, slots, a series of connected openings of individual shape or shapes, or very deep scores connecting or positioned adjacent openings.

Figure 5:
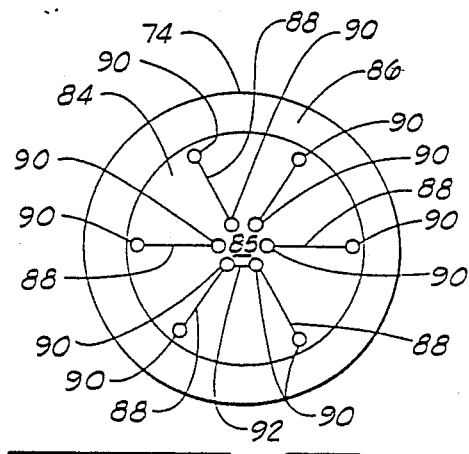
FIG. 5 is a top plan view of yet another alternate form of rupture member of the present invention which can be utilized in the assemblies of FIGS. 1 or 3.

As shown in FIG. 5, and as has heretofore been the practice, the elongated openings 88 can terminate in enlarged openings. That is, the rupture member, designated as 74 in FIG. 5, can include circular openings 90 at the inner and outer ends of each of slits 88. The openings 90 can be located at only the inner ends of the slits 88 and can take other shapes such as square, triangles, etc.

In accordance with the present invention, at least one rupture pressure determining score is formed in the rupture member connecting the inner ends of two or more of the elongated openings formed therein. For example, as shown in FIGS. 1 and 2, a plurality of arcuate rupture pressure determining scores 32 defining a continuous circle are formed in the rupture member 14 connecting the inner ends of all of the slits 28. The term "rupture pressure determining score" is used herein to mean a groove or indentation or a series of grooves or indentations (similar to a dashed line) formed in a surface of the rupture member having the effect of forming lines of weakness in the rupture member whereby when a predetermined rupture pressure is exerted on the rupture member, rupture is initiated by the tearing of the rupture member at such groove or indentation or series of grooves or indentations. The term "connecting the ends" is used herein to mean that the rupture pressure determining score or scores intersect the end portions of two or more elongated openings.

As shown in FIG. 3, the scores 62 can connect between less than all of the inner ends of the elongated openings 58, or as shown in FIG. 5, a single score 92 can connect between two of the inner ends of adjacent elongated openings 88 or between two of the circular openings 90. As shown in FIG. 4, the scores 68 can be arcuate and connect between the ends of the elongated arcuate openings 66 whereby the scores 68 and the elongated openings 66 lie on a line defining a circle. Also, the score or scores 68 can be straight or of other configuration.

The arrangement illustrated in FIG. 2 wherein the scores 32 connect between all of the inner ends of the slits 28 is generally utilized in low pressure applications, and because the individual scores 32 form a circle, a single circular die can be utilized for forming the scores. In higher pressure applications where there is more force exerted on the central portion of the rupture member tending to disconnect it from all of the sector shaped portions defined by the elongated openings, the score configuration illustrated in FIG. 3 can be utilized. That is, because in the configuration shown in FIG. 3 wherein a score does not connect between two of the inner ends of adjacent slits 58, the central portion 55 remains connected to the sector shaped portion defined by those slits. In other applications involving high pressures, a single score connecting between the inner ends of two adjacent elongated openings can be utilized. Upon rupture, tearing takes place at the score which causes one sector shaped portion to open. The force of the pressurized fluid flowing through the sector shaped opening formed causes tearing between the inner ends of all but one pair of the other elongated openings whereby full opening occurs with the central portion remaining connected to one of the sector shaped portions.

Referring again to FIG. 1, positioned adjacent the rupture member 14 on the opposite side thereof from the positioning member 12 is the resilient sealing member 16. The sealing member 16 is generally formed of a resilient corrosion resistant plastic material and is of a peripheral size and shape corresponding with the peripheral size and shape of the rupture member 14.

The support member 18 can take a variety of forms. For example, as shown in FIG. 1, it can be a flat circular member formed of rigid material having a diameter greater than the diameters of the members 12, 14 and 16 so that a peripheral portion can be folded upwardly forming an annular lip 33. Upon assembly of the members 12, 14, 16 and 18 in nesting relationship, the lip 33 can be folded over the outer peripheral edges of the members 12, 14 and 16 as shown in FIGS. 6 and 7 whereby the members are rigidly clamped together. The flat circular portion of the support member 18 includes a plurality of slots 34 radiating outwardly from a central portion 36 and terminating near the periphery thereof forming a plurality of sector shaped portions 38 therein. As indicated above, the support member 18 functions to support the sealing member 16 when a reverse pressure such as a short-term vacuum is exerted across the assembly 10. In applications where it is desired to positively relieve fluid pressure in both directions through the assembly 10, the support member 18 can itself be a rupture member and function in the same manner as the rupture member 14.

Referring now to FIGS. 6 and 7, the assembled composite rupture disk assembly 10 is illustrated clamped between a pair of annular supporting members 40 and 41, e.g., pipe flanges. Studs 42 and nuts 44 retain the annular supporting members 40 and 41 in clamped and sealed engagement with the assembly 10 so that fluids under pressure contained within the conduit 46 connected to the annular supporting member 40 and to a pressure vessel or system (not shown), are prevented from passing into the annular supporting member 41 and a conduit 48 connected thereto. A conventional gasket 45 is positioned between the assembly 10 and the annular supporting member 40.

The annular supporting members 40 and 41 include raised face portions 50 which coact with the annular flange portions of the assembly 10. The upstanding frusto-conical portion 20 of the positioning member 12 extends within the annular supporting member 41 thereby automatically positioning the assembly 10 centrally within the annular supporting members 40 and 41 during installation.

In operation of the assembly 10, fluid pressure from the vessel or system being protected is exerted on the sealing member 16 of the assembly 10 by way of the conduit 46, the annular supporting member 40 and the slots 34 of the support member 18. As a result, the resilient sealing member 16 deforms into contact with the concave surface of the rupture member 14. Upon pressure reversal, e.g., the temporary existence of a vacuum in the pressure system or vessel being protected or the reverse exertion of pressure by way of the conduit 48, the annular supporting member 41 and the slits 28 of the rupture member 14 against the sealing member 16, the sealing member 16 deforms into contact with the support member 18. The slots 34 of the support member 18 are positioned such that the support member 18 can support the resilient sealing member 16 under a predetermined reverse pressure, but readily ruptures and opens upon the rupture of the rupture member 14 and sealing member 16 in the opposite direction.

As indicated above, the fluid pressure exerted on the assembly 10 from the pressure vessel or system being protected is transmitted to the concave surface of the rupture member 14 thereby placing it in tension. Upon reaching the rupture pressure of the scores 32, i.e., exceeding the tensile strengths of the solid portions of the rupture member 14 beneath the scores 32 between the inner ends of the slits 28, the rupture member 14 ruptures by tearing along the scores 32. Because of manufacturing variances in the lengths of material portions between the inner ends of the slits 28, all of the portions of the rupture member 14 between the inner ends of the slits 28 tear except for one such portion (having the greatest length) to which the central portion 25 thereof remains connected. When the rupture member 14 ruptures, the resilient sealing member 16 also ruptures causing pressure to be relieved through the assembly 10. The force of the pressure release, i.e., the flow of pressurized fluid through the assembly 10, causes the support member 18 to also open. That is, the tensile strength of the portions of the support member 18 lying between the inner ends of the slots 34 is exceeded by the force of pressurized fluid passing through the slots 34 thereby causing the support member 18 to tear between the inner ends of the slots 34. However, as in the case of the rupture member 14, one portion of the support member 18 between two of the inner ends of the slots 34 remains intact to which the central portion 36 remains attached. As illustrated in FIG. 7, after rupture and initial pressure release, the composite rupture disk assembly 10 is opened with the sector shaped portions 27 of the rupture member 14 and the sector shaped portions 38 of the support member 18 bent upwardly providing full pressure relief to the pressure vessel or system being protected. The central portion 25 of the rupture member 14 remains attached to one of the sector shaped portions 27 thereof and the central portion 36 of the support member 18 remains attached to one of the sector shaped portions 38 thereof. As indicated, upon rupture, the resilient sealing member 16 also ruptures in sector shaped portions substantially similar to the sector shaped portions 27 of the rupture member 14.

The composite rupture disk assembly of this invention can omit the positioning member 12 and/or the support member 18 of the assembly 10, and can be comprised only of the rupture member 52 and the sealing member 54 as illustrated in FIG. 3. Optionally, the assembly can be comprised of a pair of rupture members, either flat or including a concave-convex portion with the resilient sealing member positioned therebetween. The use of one or more rupture pressure determining scores formed in the rupture member and connecting the ends of two or more of the elongated openings to control the predetermined rupture pressure of the rupture member simplifies the manufacturing procedure and allows a single thickness of material to be used for forming the rupture member over a wide rupture pressure range. This results in a less expensive composite rupture disk assembly product as well as the more accurate control of the rupture pressure of such product.

More specifically, the trial and error technique utilized heretofore requires that the distance between the inner ends of two of the elongated openings in the rupture member be changed and/or the thickness of the material utilized be changed in order to change the pressure at which the rupture member bursts, i.e., the rupture pressure of the rupture member. In order to make it easier to change the distance between the inner ends of the elongated openings, enlarged circular holes at the inner ends thereof have been used. This allows the distance between adjacent holes to be changed rather than changing the locations of the elongated openings. Thus, the procedure heretofore used involves selecting a material of a certain thickness, forming a rupture member from that material having elongated openings therein, forming holes at the inner ends of the elongated openings and then causing the resulting rupture member to burst to thereby determine its rupture pressure. If the rupture pressure determined is too high or too low, then a second rupture member is made from the same material and the distance between adjacent holes at the inner ends of adjacent openings is decreased or increased, respectively. This procedure is continued until the desired rupture pressure is obtained. In the event the desired rupture pressure cannot be obtained by changing only the distance between adjacent holes, a different thickness of material or kind of material is selected and the procedure is repeated.

The foregoing is contrasted with the trial and error procedure required by the present invention wherein the desired burst pressure can be relatively quickly achieved by forming the one or more scores described above in the rupture member. That is, the trial and error technique utilizing the present invention is comprised of selecting a material of particular thickness, forming a rupture member having elongated openings therein from the material with or without holes at the inner ends of the openings and then testing the rupture member to determine its rupture pressure. If the rupture pressure is too low, then either the distances between the inner ends of adjacent elongated openings or holes formed at the ends are increased or the material or material thickness is changed whereby a rupture pressure above the desired rupture pressure is obtained. One or more scores are then utilized to "fine tune" the rupture pressure to that which is desired. That is, one or more scores are formed in the rupture member and the rupture member is tested for rupture pressure. If the rupture pressure so determined is above or below the desired rupture pressure, it is a simple matter to change the depth and/or score arrangement until the desired rupture pressure is obtained. The score depth is easily adjusted in the range of from no depth to a depth of 95% of the material thickness which allows quick and easy rupture pressure adjustment. In practice, once a rupture member is formed having a rupture pressure above the desired rupture pressure, a quantity of such rupture members is produced. That quantity is then used to determine the particular score configuration and depth required to achieve the desired rupture pressure after which any desired number of rupture members having the desired rupture pressure can be manufactured. The prior art trial and error technique requires the manufacturing of many rupture members having different hole patterns and/or different material thicknesses and many test ruptures of such rupture members to find the best combination. This in turn involves many time-consuming tooling changes, etc.

The present invention, therefore, is well adapted to carry out the objects and attain the ends and advantages mentioned as well as those inherent therein. While presently preferred embodiments of the invention are given for the purpose of this disclosure, numerous changes in the details of construction and arrangement of parts can be made which will readily suggest themselves to those skilled in the art.

What is claimed is:

1. In a composite rupture disk assembly adapted to be supported between inlet and outlet supporting members which includes a resilient sealing member and a rupture member having a plurality of elongated openings formed therein, the rupture member being positioned adjacent the sealing member whereby rupture takes place when pressure exerted on the sealing member and transmitted to the rupture member reaches a predetermined rupture pressure, the improvement which comprises said rupture member having at least one rupture pressure determining score formed therein connecting the ends of two or more of said elongated openings.

2. The rupture disk assembly of claim 1 wherein said elongated openings extend outwardly from a central portion of said rupture member and said rupture pressure determining score connects the inner ends of said elongated openings.

3. The rupture disk assembly of claim 1 wherein said elongated openings are arcuate and are positioned on a line defining a substantially circular shape in said rupture member.

4. The rupture disk assembly of claim 2 wherein said elongated openings are slits which radiate outwardly from said central portion defining a plurality of sector shapes in said rupture member.

5. The rupture disk assembly of claim 1 wherein said elongated openings are slits with enlarged openings at the end thereof.

6. The rupture disk assemblies as defined in claim 4 or claim 5 wherein said rupture member includes a plurality of rupture pressure determining scores connecting the inner ends of all of said slits.

7. The rupture disk assembly of claim 1 wherein said rupture member has a concave-convex portion connected to an annular flat flange portion and is positioned with the concave side adjacent said sealing member.

8. The rupture disk assembly of claim 7 wherein said elongated openings are slits formed in said concave-convex portion of said rupture member.

9. The rupture disk assembly of claim 8 wherein said slits radiate outwardly from said central portion to near said annular flat flange portion defining a plurality of sector shapes in said concave-convex portion of said rupture member.

10. The rupture disk assembly of claim 9 wherein said slits include enlarged openings at the ends thereof.

11. The rupture disk assemblies as defined in claims 9 or 10 wherein said rupture member includes a plurality of rupture determining scores connecting the inner ends of all of said slits.

12. A rupture member for use in a composite rupture disk assembly which includes a resilient sealing member comprising a substantially circular section of thin rigid material having a plurality of elongated openings formed therein and having at least one rupture pressure determining score formed therein connecting the ends of two or more of said elongated openings so that rupture of said rupture member occurs when pressure transmitted to said rupture member reaches a level equal to or exceeding said rupture pressure.

13. The rupture member of claim 12 wherein said elongated openings extend outwardly from a central portion of said rupture member and said rupture pressure determining score connects the inner ends of said elongated openings.

14. The rupture member of claim 12 wherein said elongated openings are arcuate and are positioned on a line defining a substantially circular shape in said rupture member.

15. The rupture member of claims 13 or 14 wherein said elongated openings are slits.

16. The rupture member of claim 12 which is further characterized to include a concave-convex portion connected to an annular flat flange portion.

17. The rupture member of claim 16 wherein said elongated openings are slits and are formed in said concave-convex portion of said rupture member.

18. The rupture member of claim 17 wherein said slits radiate outwardly from a central portion of said concave-convex portion of said rupture member to near said annular flat flange portion thereof defining a plurality of sector shapes in said concave-convex portion.

19. The rupture member of claim 18 wherein said slits include enlarged openings at the ends thereof.

20. The rupture members as defined in claims 18 or 19 wherein a plurality of rupture determining scores connect the inner ends of all of said slits.

* * * * *